SCHNEIDER & MONTGOMERY.
Draw-Bridges.
No. 5,372. Reissued April 22, 1873.
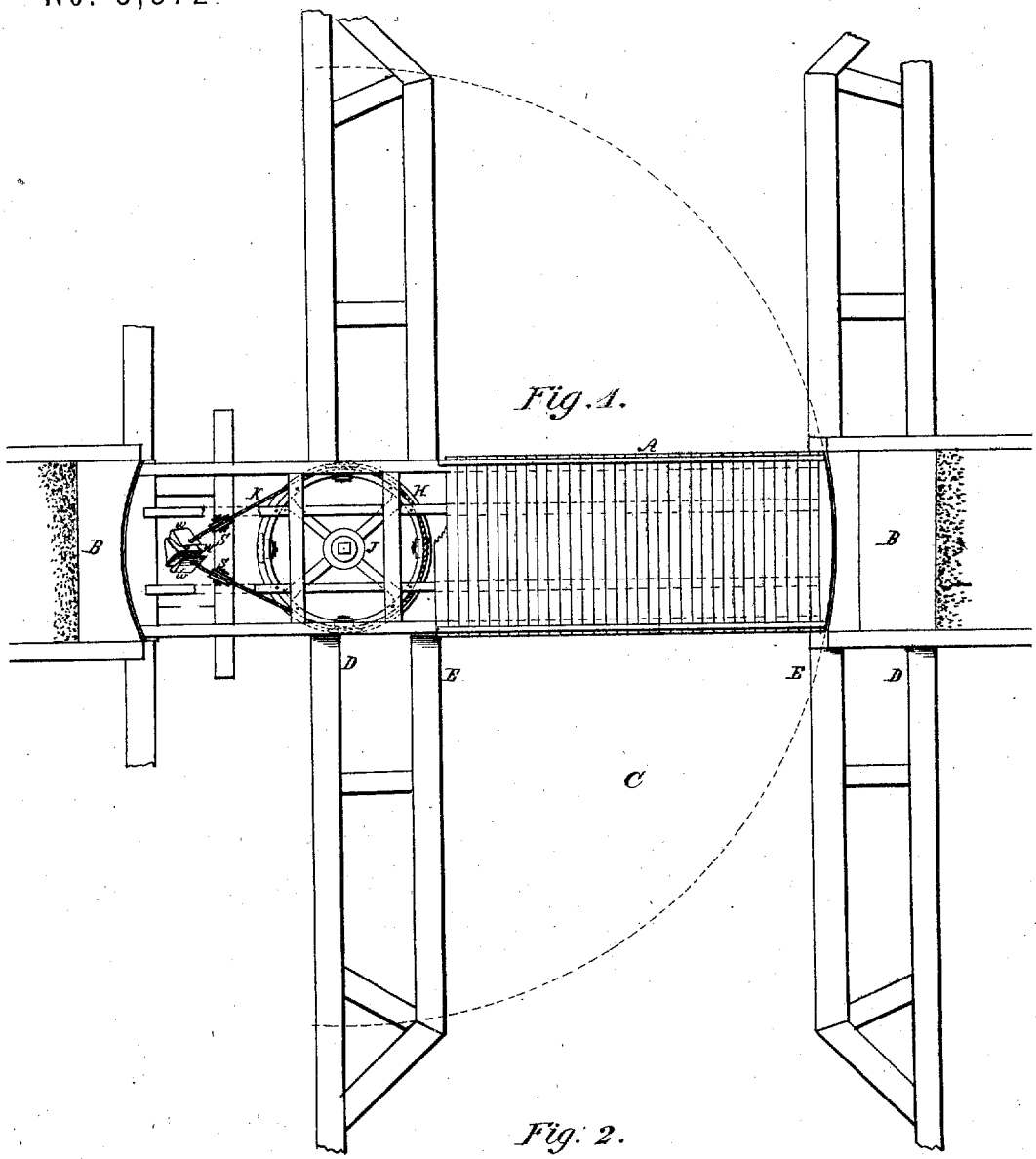
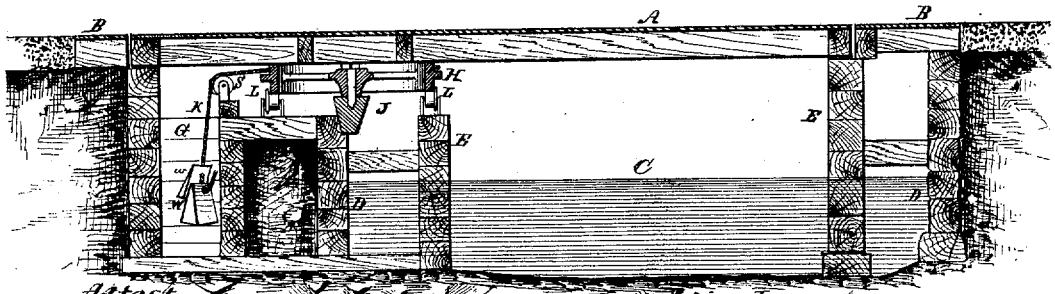
Attest,
Joel Peyton,
Baltis DeLong
Inventors,
Louis Schneider } by their Atty
John A. Montgomery } Wm. D. Bolomin
AM. PHOTO-LITHOGRAPHIC CO. N.Y. (OSBORNE'S PROCESS.)

UNITED STATES PATENT OFFICE.

LOUIS SCHNEIDER, OF WILLIAMSPORT, PA., AND JOHN A. MONTGOMERY, OF SPRINGFIELD, N. J., ASSIGNORS TO LOUIS SCHNEIDER.

IMPROVEMENT IN DRAW-BRIDGES.

Specification forming part of Letters Patent No. 29,917, dated September 4, 1860; reissue No. 5,372, dated April 22, 1873; application filed March 17, 1873.

*To all whom it may concern:*

Be it known that we, LOUIS SCHNEIDER, of Williamsport, Lycoming county, Pennsylvania, and JOHN A. MONTGOMERY, formerly of said Williamsport, but now of Springfield, Union county, New Jersey, have invented a new and useful Improvement in Self-Acting Draw-Bridges, of which the following is a specification:

Our invention has more especial relation to short bridges, such as those spanning canals; and its object is so to counterbalance the bridge that it may easily be swung out of the way by a boat passing in either direction, and automatically return to its normal position after the boat has passed.

In the accompanying drawing, Figure 1 shows a plan view of a canal-bridge, and its appurtenances, in which our improvement is embodied; and Fig. 2, a vertical longitudinal central section therethrough.

The stream or canal C has a suitable abutment or docking, D, on each side, inside of which docking projects a frame, E, which serves as a fender and guide for the boat, and as a support for the bridge, and is so constructed as to leave a space between it and the docking for the backwater created by the displacement caused by the passing boat. The bridge A turns on a pivot or spindle, J, mounted firmly in proper supports, and is also provided with a wheel, H, running on rollers L to steady it and diminish friction. A roadway, B, leads to the bridge at each end, both bridge and roadway being properly curved at their junctions to permit the bridge to swing freely. An endless chain, K, passing around the wheel H and over pulleys S, descends into a well, G; a heavy weight, W, attached to this chain at its middle tends to keep the bridge always in proper position across the stream, while lighter weights W, attached to the chain on each side, tend to keep each side of the chain taut, and thus prevent its displacement.

The bridge, by this mode of construction, turns easily upon its bearings, and is readily swung round in either direction, as shown by the dotted lines in Fig. 1, by the momentum of a boat coming in contact with it, so as to permit the boat to pass. The weight W being drawn up by the rounding of the chain on one side of the wheel, the other side of the chain simultaneously slackens. When the boat has passed the weight descends again, drawing the bridge back to its normal position.

It is obvious that the bridge can be adjusted relatively to the roadway or canal by varying the position of the weight on the chain.

The well may be dispensed with by using a longer chain and passing it over a suitable frame of the height required.

The advantages of such a bridge over canals, or crossings of traveled streets or roads, is obvious; and our bridge is peculiarly advantageous, being pivoted near one end and on one bank, and swinging entirely clear of the channel when open.

We claim—

A turning bridge, constructed substantially as hereinbefore set forth, so as to be swung open by a vessel passing in either direction, and automatically closing itself as soon as the vessel has passed.

LOUIS SCHNEIDER.
J. A. MONTGOMERY.

Witnesses to signature of SCHNEIDER:
HEPBURN MCCLURE,
ADDIS MCVEAGH.

Witnesses to signature of MONTGOMERY:
S. A. KITCHELL,
B. HAGAMAN.